Nov. 16, 1943.  W. T. CRIGHTON  2,334,317
METHOD OF TREATING MILK
Filed Aug. 7, 1939
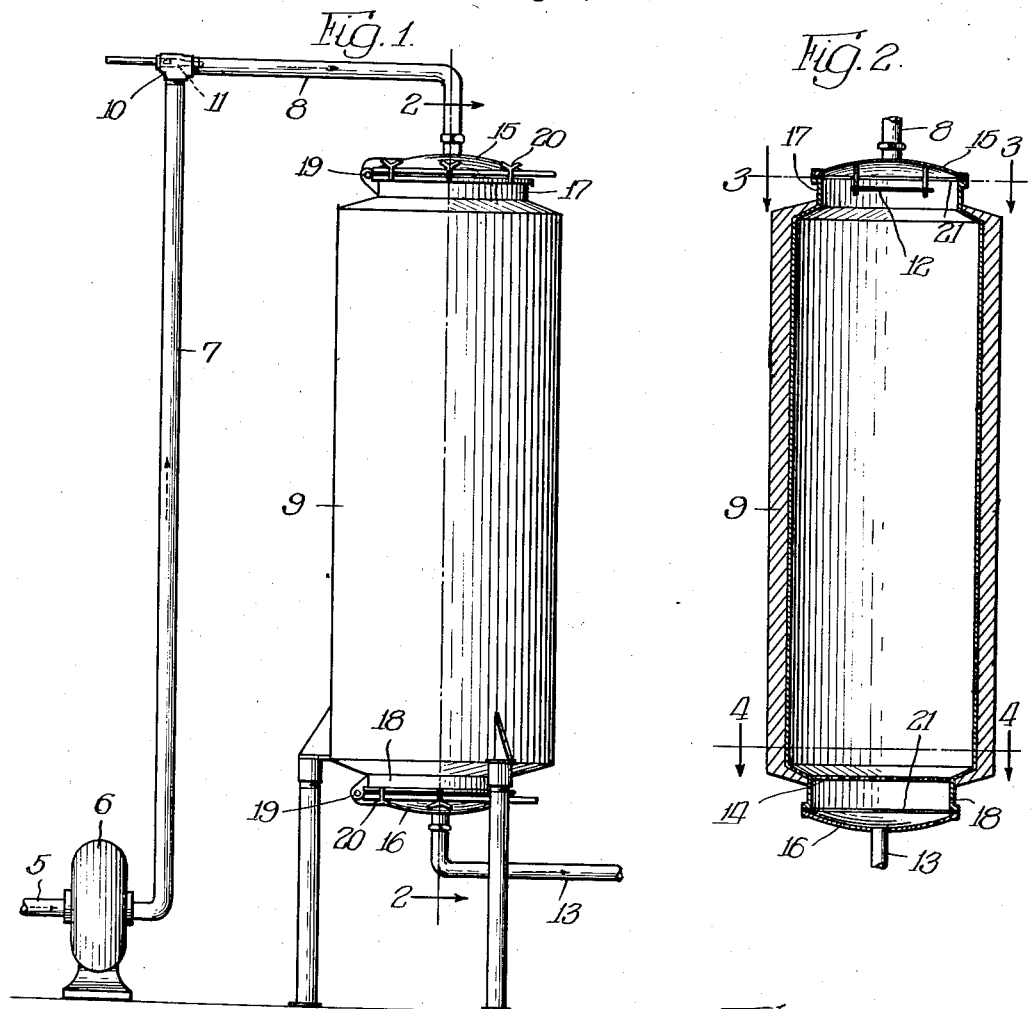
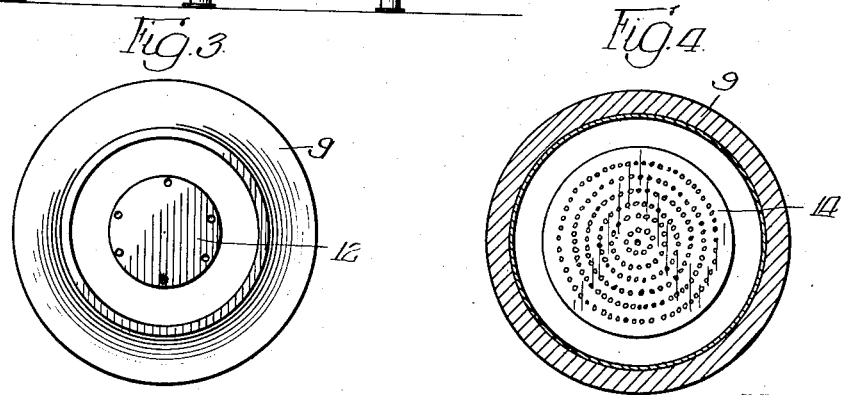
INVENTOR.
William T. Crighton,
BY John A. Marzall
ATTORNEY.

Patented Nov. 16, 1943

2,334,317

UNITED STATES PATENT OFFICE 2,334,317

METHOD OF TREATING MILK

William T. Crighton, Springfield, Mo., assignor to Producers Creamery Company, Springfield, Mo., a corporation of Missouri Application August 7, 1939, Serial No. 288,757

1 Claim. (Cl. 99—212)

This invention relates to the method or process, and to the apparatus for treating skim or whole milk before condensing or drying the milk, and an important object of the invention is to so treat the milk in a new and improved manner by subjecting the milk to a continuous heat treatment in a closed system so as to improve the baking qualities of the finished products when used in bread or any other baking products.

Another important object of the invention is the method of heat treating milk by a continuous heat treatment under pressure, the milk being held in liquid form for a period of from one to ten minutes at a temperature of 212° to 280° F. so as to give best results in dehydrating the milk proteins.

Another object of the invention is the method of preheating milk to a temperature of approximately 190° F. and then raising the temperature of the milk, in a closed system, to a temperature of from 220° to 230° F. for a period of approximately four minutes to eliminate, as much as possible, discoloration of the milk, and the heated flavors thereof, in the finished product.

A still further object of the invention is the method of treating milk by passing the milk through an internal tubular heater of a predetermined size and capacity, and installing a steam jet in one end thereof, whereby the live steam will be in direct contact with the flowing milk.

Still another object of the invention is the method of treating milk by heating the milk under pressure at a temperature above the boiling point so as to cause a change in the distribution of the various salt components and the denaturation of the proteins, to provide better baking qualities of the milk products.

Another object of the invention is the provision of new and improved means or apparatus for carrying out the method or process.

Numerous other objects and advantages will be apparent throughout the progress of the following specification.

The accompanying drawing illustrates a selected embodiment of the invention, and the views therein are as follows:

Fig. 1 is a detail elevational view showing certain of the apparatus which may be used in carrying out the method embodied herein;

Fig. 2 is a longitudinal sectional view on the line 2—2 of Fig. 1;

Fig. 3 is a transverse sectional view on the line 3—3 of Fig. 2; and

Fig. 4 is a transverse sectional view on the line 4—4 of Fig. 2.

Milk, either skim or whole, or a combination thereof, is generally subjected to a heat treatment before the milk is condensed or dried so as to improve the baking qualities of the resultant product. Ordinarily this treatment consists of subjecting the liquid milk, in either open or closed containers, to temperatures ranging from 160° to 200° F., and holding such heated liquid milk for various periods of time. This method requires that the liquid milk be treated in batches of various quantities, making it impossible to subject each particle of milk to an even treatment, or to maintain the temperatures above the boiling point.

In accordance with the present invention, it has been found that when liquid milk is heated above the boiling point, and held at that temperature for a predetermined length of time, the baking qualities of the milk were improved when used in bread. It is therefore an important provision of the present invention to heat treat the liquid milk, under pressure continuously to a temperature of from 212° to 280° F., and hold the liquid at that temperature for a period of from one to ten minutes. When heating the milk, and particularly skim milk, above the boiling point, there will be a slight increase in the insoluble milk proteins, but there will also be a minimum of discoloration, and heated flavors in the finished product. To raise the temperature of the milk to the desired heat, live steam may be injected into direct contact with the milk. The milk is first preheated to the desirable temperature before it is subjected to the higher heat treatment. In actual practice the liquid milk is preheated to approximately 190° before it is processed to a point above the boiling point. The preheating operation may be accomplished by injecting live steam into contact with the liquid milk to be treated or processed. Another way to preheat the liquid milk is to pass the untreated milk through an internal tubular heater of the proper size and capacity. Regardless of the manner employed in preheating the milk, the steps of the process for finally treating the milk consists in the application of live steam into direct contact with the preheated liquid milk to bring the temperature of the milk to above the boiling point and then holding the temperature of the milk at the desired heat for the proper time interval. The time and temperature may be varied within certain limits to produce the best results in dehydrating the milk protein.

The present process secures a more uniform product in less time and in a more economical manner than any of the processes hereinbefore known, and one form of apparatus for carrying out this process is shown in the accompanying drawing wherein an inlet pipe line 5 is operatively connected to a pump 6. The opposite end of the pipe 5 leads to a milk supply which has been preheated to a temperature of approximately 190° F. by an internal heater. The pump 6 draws the preheated milk through the line 5 and forces it into the pipe lines 7 and 8, which lead to a high temperature holder 9. A fitting 10 is arranged in the line 8, preferably at the connection with the line 7, and this fitting carries a steam jet 11 to eject steam from a suitable source of supply in direct contact with the liquid milk in the line 8. The steam coming through the ejector 10 is live steam and is in direct contact with the preheated liquid milk. The amount of steam and the temperature thereof is regulated so as to heat the milk passing through the line 8 to a temperature ranging anywhere from 212° to 280° F., as desired.

Milk coming through the line 8, before entering the high temperature holder 9, strikes a baffle 12, Figs. 2 and 3. This baffle is arranged inside of the holder 9 at the intake end to check or spread the flow of the milk, otherwise the milk flow would have a tendency to be faster in the center of the holder than at the edges. The milk enters the high temperature holder from the positive pressure pump 6 at a high velocity at the rate of about 18,000 pounds per hour. Without the baffle plate 12, the milk around the side wall of the holder may be held at the high temperature for a period longer than the milk at the center of the holder, because without the baffle, the milk would be forced through the center of the holder in a vortex forming an eddy at the sides.

A discharge pipe line 13 leads from the bottom of the holder 9 to discharge the milk from the holder 9. A perforated disk 14, Figs. 2 and 4, is arranged at the lower end of the holder 9, and its purpose is similar to the purpose of the baffle 12. This perforated disk 14 prevents the milk from flowing directly through the center of the holder at a higher velocity than the milk around the edges.

In actual practice it has been found that best results are obtained by subjecting the preheated liquid milk to a temperature of from 220° F. to 230° F. for a period of four minutes. However, if the temperature is increased, the time element is proportionally decreased. Likewise, if the temperature is reduced, the time element is increased so a proper ratio is retained. In summer, from about April to August, when the proteins or milk constituents are relatively soft, the best results are obtained by heating the preheated liquid milk to a temperature of approximately 220° F., and holding the milk at that temperature for approximately four minutes. During the rest of the year when the proteins and constituents are harder, it has been preferable to bring the heat up to a temperature of 230° F. for a four minute period.

It is preferably to have a holding container of a known capacity, and in the present embodiment the holder 9 has a capacity of 18,000 pounds per hour or 300 pounds per minute. The holder 9 holds 1200 pounds of milk; therefore, milk entering the inlet and leaving the outlet at the rate of 300 pounds per minute will require four minutes to pass through the holder. The holder 9 is insulated and therefore the temperature of 220° or 230° is maintained while the milk is in the holder. The operation of the apparatus and the method therefore is a continuous one even though the heat period of 220° to 230° F. is maintained for four minutes.

Upper and lower manhole covers 15 and 16, respectively, are fastened about the necks 17 and 18 of the holder 9, being attached thereto by heavy hinged couplings 19 and held in position by wing nuts 20. Gaskets 21 are arranged between the covers 15 and 16 and the body of the holder to insure a tight connection.

Milk treated in accordance with the present invention, under pressure and at a temperature above the boiling point, causes the various milk constituents to be affected to an extent dependent upon the severity of the treatment. The albumin and globulin of the milk are completely precipitated. The calcium caseinate is destabilized by hydration but is not completely coagulated until temperatures of 266° to 280° F. are reached. The destabilization of caseon may also be indirectly affected by changes in the calcium casein ratio. This results from the effect of heat on the calcium and magnesium which may be precipitated as citrates and phosphates. The lactose (milk sugar or sugar of milk) is also affected by the heat treatment. Because of its active ketone group, it is capable of reacting with the amino acids in the presence of heat to form sugar protein complexes. The formation of these compounds, and acids from certain other milk constituents cause an increase in the titratable acidity and a decrease in the pH.

In general, the heat treatment causes a change in the distribution of the various salt components and the denaturation of the proteins, which result in the better baking qualities of the milk products.

The invention herein contemplates the preheating of the liquid milk to about 190° F. through an internal heater before entering the positive pressure pump 6. The positive pressure pump forces the preheated material through the lines 7 and 8 and into the high temperature holder 9. Before the milk passes into the high temperature holder, it comes into contact with live steam entering through the ejector 11 to heat the milk to the desired temperature, ranging from boiling point (212° F.) to as high a temperature as desired (280° F.). The heated milk is held at the heated temperature for a predetermined length of time. The best results, however, have been obtained by heating to 220° to 230° F. and holding that temperature for about four minutes duration. However, a decrease in the temperature necessitates an increase in the time period, or a decrease in the time period requires an increase in temperature.

The heated milk, entering the holder 9, is prevented from eddying or passing too rapidly through the holder and out of the outlet 13, by reason of the baffle plate 12 and the lower perforated plate 14. Therefore, the operation is continuous, the milk being continuously drawn from the source of supply after being preheated, and then being deposited in the holder 9, but brought up to the desired temperature before entering the high temperature holder 9. The milk is also drawn off continuously and delivered to suitable condensing or dehydrating apparatus, as the case may be. The flow of the milk through the high temperature holder 9, however, is so regulated that the flow will be even and the proper temperature maintained throughout the entire volume of milk.

The invention therefore provides apparatus which is relatively simple in construction and economical in operation, and the method produces a resulting milk product having very favorable and desirable baking qualities. The method is a continuous one in that the milk from the preheating chamber to the discharge outlet 13 is continuous.

Changes may be made in the form, construction and arrangement of the parts, and the method may be varied within certain degrees without departing from the spirit of the invention or sacrificing any of its advantages, and the right is hereby reserved to make all such changes as fairly fall within the scope of the following claim.

The invention is hereby claimed as follows:

The method of treating milk which consists in pre-heating liquid milk to a temperature of approximately 190° F., passing the milk under pressure through a circuit out of contact with the atmosphere, injecting live steam into direct contact with the milk while in said circuit to raise the temperature of said milk to a predetermined high temperature above the boiling point, thereafter delivering the milk as a liquid body and in the form of a tubular sheet into the top of a high temperature holder having a predetermined accumulated body of undivided liquid milk therein, causing said milk in said accumulated liquid body to constantly flow downwardly in said holder while holding the milk in the holder for a predetermined length of time and maintaining said milk under pressure and at substantially said predetermined high temperature, and continuously withdrawing milk from the bottom of the temperature holder at substantially the same rate as it is delivered to the holder.

WILLIAM T. CRIGHTON.